United States Patent
Acharya Chandrashekar et al.

(10) Patent No.: US 11,848,764 B1
(45) Date of Patent: Dec. 19, 2023

(54) ORDERED OBJECT PROCESSING IN CLOUD OBJECT STORAGE

(71) Applicant: INTERNATIONAL BUSINESS MACHINES CORPORATION, Armonk, NY (US)

(72) Inventors: Charan Acharya Chandrashekar, Bangalore (IN); Mohan Narayanswamy, Dublin (IE); Lior Aronovich, Thornhill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/099,383

(22) Filed: Jan. 20, 2023

(51) Int. Cl.
*H04L 65/60* (2022.01)
*H04L 67/1097* (2022.01)
*G06F 9/54* (2006.01)
*G06F 11/14* (2006.01)

(52) U.S. Cl.
CPC .......... *H04L 67/1097* (2013.01); *G06F 9/547* (2013.01)

(58) Field of Classification Search
CPC ..... H04L 67/1097; H04L 65/60; G06F 9/547; G06F 17/30; G06F 11/14; G06F 3/06
USPC ......................................................... 709/219
See application file for complete search history.

(56) References Cited

U.S. PATENT DOCUMENTS

| 9,507,812 | B2 | 11/2016 | Bestler et al. |
| 9,921,918 | B1* | 3/2018 | Yellapragada ........ G06F 16/113 |
| 10,873,629 | B2 | 12/2020 | Shetty et al. |
| 10,936,516 | B2 | 3/2021 | Danilov et al. |
| 11,093,465 | B2 | 8/2021 | Cheru et al. |
| 2014/0149794 | A1* | 5/2014 | Shetty ................... G06F 16/951 709/213 |
| 2019/0220198 | A1* | 7/2019 | Kashi Visvanathan ...................... G06F 3/067 |
| 2019/0220360 | A1* | 7/2019 | Kashi Visvanathan ...................... G06F 3/0608 |
| 2019/0220367 | A1* | 7/2019 | Kashi Visvanathan ...................... G06F 11/1448 |

(Continued)

FOREIGN PATENT DOCUMENTS

WO 2018145227 8/2018

OTHER PUBLICATIONS

Anonymous, "Introduction to Iterators in C++", https://www.geeksforgeeks.org/introduction-iterators-c/, Apr. 28, 2022, 9 pages.
Amiana, "Iterators: The link between Data Structures and Algorithms", https://dev.to/iamdeb25/iterators-the-link-between-data-structures-and-algorithms-3aoo, Aug. 28, 2021, 8 pages.

(Continued)

*Primary Examiner* — Jude Jean Gilles
(74) *Attorney, Agent, or Firm* — Rakesh Roy; Andrew D. Wright; Calderon Safran & Cole P.C

(57) ABSTRACT

A method includes: creating and maintaining, by a cloud object storage server, plural order data structures that define respective orders of objects stored in a bucket in a cloud object storage system; receiving, from a client device, a request to download the objects using one of the respective orders; allocating an iterator for the request, wherein the iterator is associated with a respective one of the plural order data structures that defines the one of the respective orders; returning an iterator identifier of the iterator to the client device; receiving, from the client device, a call containing the iterator identifier; and returning the objects to the client device in the one of the respective orders using the iterator and the respective one of the plural order data structures.

20 Claims, 6 Drawing Sheets

(56) References Cited

U.S. PATENT DOCUMENTS

2019/0220527 A1* 7/2019 Sarda .................. G06F 3/067

OTHER PUBLICATIONS

Amiana, "Preface: Data Structures", https://dev.to/iamdeb25/preface-data-structures-2opm, Aug. 28, 2021, 5 pages.

Leonard et al., "IBM Cloud Object Storage Concepts and Architecture", https://www.redbooks.ibm.com/redpapers/pdfs/redp5537.pdf, 2019, 34 pages.

Yildirim et al., "A Cloud-Aware Distributed Object Storage System to Retrieve Large Data via HTML5-Enabled Web Browsers", https://www.researchgate.net/publication/294581592, DOI: 10.4018/978-1-4666-9834-5.ch002, Chapter 2, IGI Global, Hershey, PA, Feb. 2016, 24 pages.

Anonymous, "Managing Objects", https://docs.oracle.com/en-us/iaas/Content/Object/Tasks/managingobjects.htm, Oracle, 2022, 8 pages.

Anonymous, "Operating System Scheduling algorithms", https://www.tutorialspoint.com/operating_system/os_process_scheduling, Archived on Oct. 14, 2022, 4 pages.

Silberschatz et al., "CPU Scheduling", https://www.cs.uic.edu/~jbell/CourseNotes/OperatingSystems/5_CPU_Scheduling, Archived on Oct. 14, 2022, 18 pages.

Anonymous, "Working with object metadata", https://docs.aws.amazon.com/AmazonS3/latest/userguide/UsingMetadata.html, Archived on Oct. 14, 2022, 4 pages.

Anonymous, "How do find smallest file size in s3 bucket using AWS CLI?", https://stackoverflow.com/questions/55501814/how-do-find-smallest-file-size-in-s3-bucket-using-aws-cli, Archived on Oct. 14, 2 pages.

Anonymous, "How to sort ascending order by last modified data for s3 using aws cli", https://stackoverflow.com/questions/65672352/how-to-sort-ascending-order-by-last-modified-date-for-s3-using-aws-cli, Archived on Oct. 14, 2022, 2 pages.

Anonymous, "AWS CLI Command Reference (../../index.html)", https://docs.aws.amazon.com/cli/latest/reference/s3api/list-objects-v2.html, Amazon Web Services, Inc., 2022, 8 pages.

* cited by examiner client.put_ordering(<bucket_name>,<ordering_type>) ← 511 client.get_ordered_iterator(<bucket_name>,<ordering_type>) ← 512 client.download_file(iterator_ID,<local_filename>) ← 513

ORDERED OBJECT PROCESSING IN CLOUD OBJECT STORAGE

BACKGROUND

Aspects of the present invention relate generally to cloud object storage and, more particularly, to downloading objects from a cloud object storage in a user-specified order.

Cloud object storage (COS) systems may store plural data objects in a bucket. These objects may be received by the COS system from one or more uploading devices or applications. The COS system may receive requests from one or more downloading devices or applications to download the objects stored in a bucket.

SUMMARY

In a first aspect of the invention, there is a computer-implemented method including: creating and maintaining, by a cloud object storage server, plural order data structures that define respective orders of objects stored in a bucket in a cloud object storage system; receiving, by the cloud object storage server and from a client device, a request to download the objects using one of the respective orders; allocating, by the cloud object storage server, an iterator for the request, wherein the iterator is associated with a respective one of the plural order data structures that defines the one of the respective orders; returning, by the cloud object storage server, an iterator identifier of the iterator to the client device; receiving, by the cloud object storage server and from the client device, a call containing the iterator identifier; and returning, by the cloud object storage server, the objects to the client device in the one of the respective orders using the iterator and the respective one of the plural order data structures.

In another aspect of the invention, there is a computer program product including one or more computer readable storage media having program instructions collectively stored on the one or more computer readable storage media. The program instructions are executable to: maintain plural order data structures that define respective orders of objects stored in a bucket in a cloud object storage system; receive, from a client device, a request to download the objects using one of the respective orders; allocate an iterator for the request, wherein the iterator is associated with a respective one of the plural order data structures that defines the one of the respective orders; return an iterator identifier of the iterator to the client device; receive, from the client device, a call containing the iterator identifier; and return the objects to the client device in the one of the respective orders using the iterator and the respective one of the plural order data structures.

In another aspect of the invention, there is system including a processor set, one or more computer readable storage media, and program instructions collectively stored on the one or more computer readable storage media. The program instructions are executable to: create plural order data structures that define respective orders of objects stored in a bucket in a cloud object storage system; receive, from a client device, a request to download the objects using one of the respective orders; allocate an iterator for the request, wherein the iterator is associated with a respective one of the plural order data structures that defines the one of the respective orders; return an iterator identifier of the iterator to the client device; receive, from the client device, a call containing the iterator identifier; and return the objects to the client device in the one of the respective orders using the iterator and the respective one of the plural order data structures.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
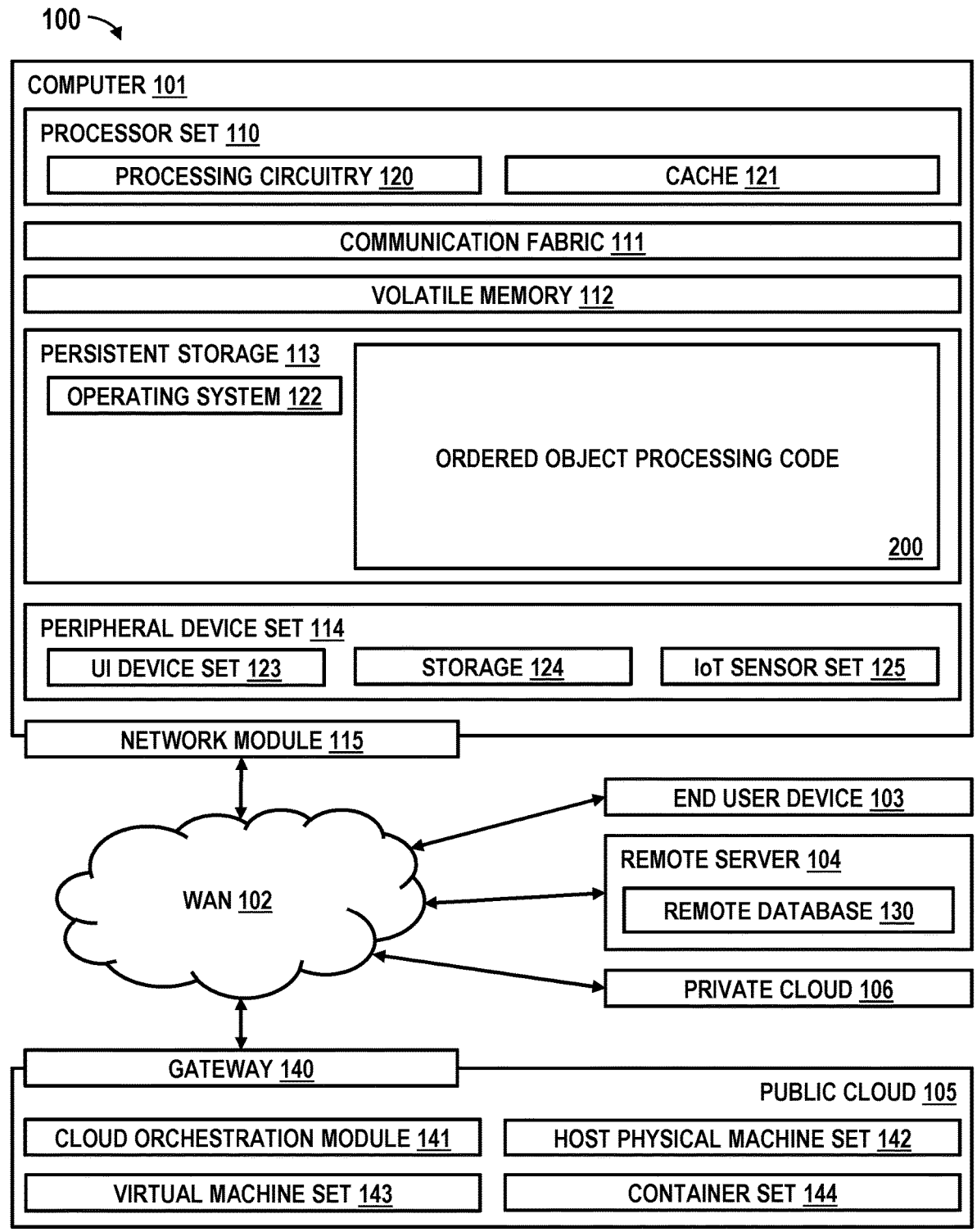
FIG. 1 depicts a computing environment according to an embodiment of the present invention.

Aspects of the present invention relate generally to cloud object storage and, more particularly, to downloading objects from a cloud object storage in a user-specified order. In accordance with aspects of the invention, there is a method for efficient retrieval of ordered objects in cloud object storage, the method comprising: maintaining by a cloud object storage server a plurality of order data structures for objects; and, responsive to a client request to download objects using an order, allocating an iterator by the cloud object storage server, and returning an iterator reference to the client. The method may include the cloud object storage server maintaining an order data structure for each specific order and bucket in the cloud object storage, where an order is based on a plurality of properties in the objects' metadata and attributes. The method may include the cloud object storage server modifying dynamically and automatically the order data structures when objects are uploaded, removed, or modified in the bucket. In embodiments, the iterator allocated by a cloud object storage server is assigned to work with a specific order data structure, is a server-side iterator, is dedicated to a client for traversing the order data structure, and efficiently supports dynamic modifications of its respective order data structure without invalidation. The method may include the client using the returned iterator reference in subsequent calls to the cloud object storage server, to facilitate retrieval of objects or their IDs according to the required order.

Implementations of the invention may be used to control certain operations of computer devices in a cloud object storage system, including controlling an order that objects are downloaded from a bucket of a cloud object storage system to a client device. Embodiments also utilize novel API calls that do not exist in conventional systems.

In embodiments, a COS server maintains a plurality of order data structures per bucket, where each order data structure supports a specific order of the objects in the bucket, based on both user and system metadata of the objects. Examples supported orders include: based on object sizes, dates, uploader identity, tags, etc.

In embodiments, the order data structures are dynamic and are modified automatically by the COS server when objects are uploaded or removed from the bucket. The order data structures can be implemented using any appropriate underlying structures, such as trees, lists, queues, etc.

In embodiments, it is possible to specify which orders to enable for a bucket, as well as modify this configuration dynamically. For example, if a new (e.g., not currently existing) order is requested for a non-empty bucket, then the COS server may scan the objects in the bucket and create the appropriate order data structure on-the-fly.

In embodiments, when a downloader wishes to download objects by a specific order, the downloader uses an API that specifies the bucket and the requested order. If that order is supported by the specified bucket, then the COS server allocates a server-side iterator that is dedicated to the downloader for working on the appropriate order data structure. The COS server returns an identifier (ID) of this iterator to the downloader. The downloader then calls a download API using the iterator ID, and the server returns objects (or object IDs) to the downloader, according to the iteration on the relevant order data structure. The downloader may be a client device or a particular application running on a client device.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as ordered object processing code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
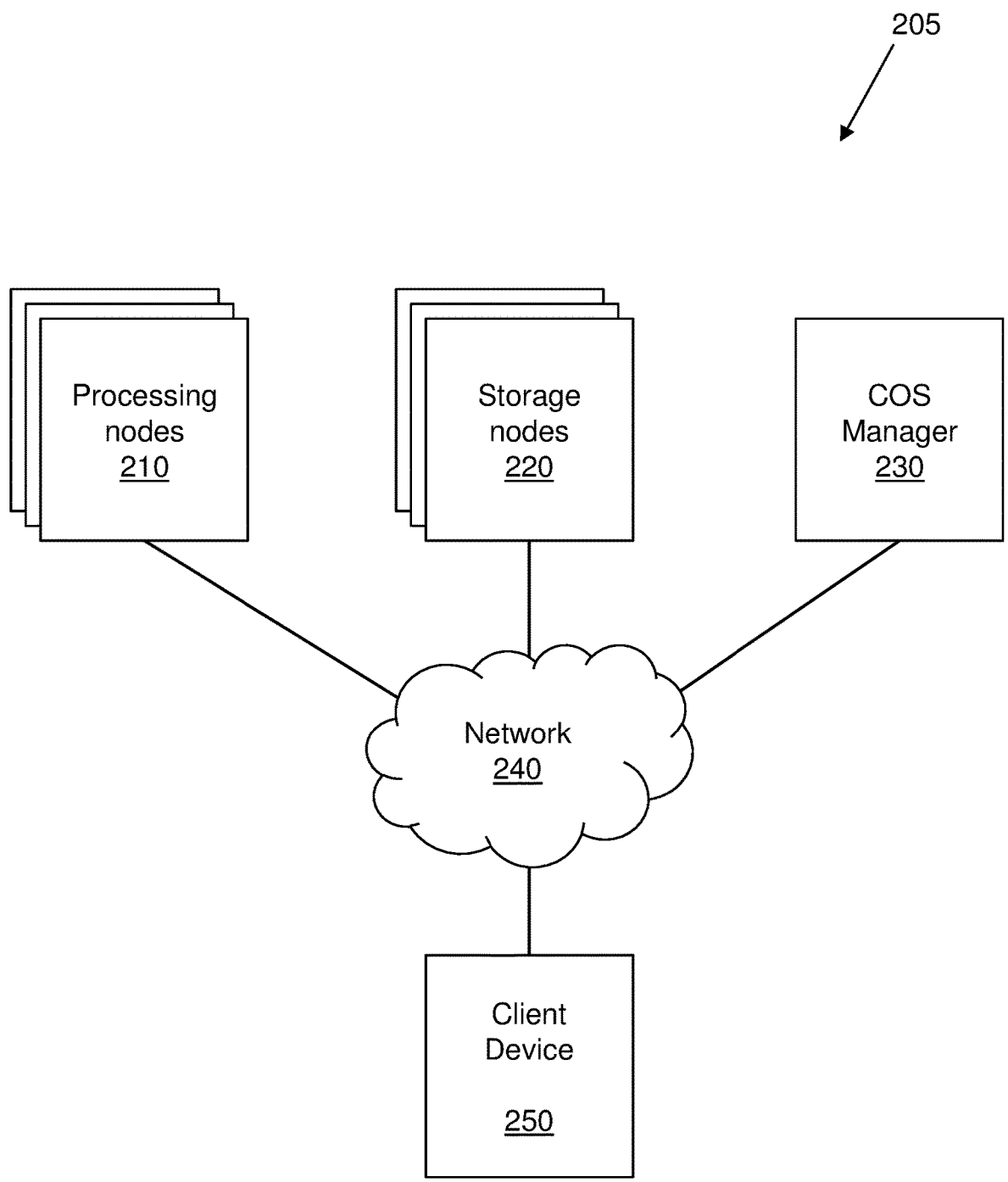
FIG. 2 shows a cloud object storage (COS) system in accordance with aspects of the invention.

FIG. 2 shows a cloud object storage (COS) system 205 in accordance with aspects of the invention. In embodiments, the COS system 205 comprises plural processing nodes 210, plural storage nodes 220, and at least one COS manager 230. The processing nodes 210, the storage nodes 220, and the COS manager 230 all communicate via a network 240, which comprises one or more computer networks such as a LAN, WAN, and the Internet. In a cloud implementation, the processing nodes 210, the storage nodes 220, and the COS manager 230 are each nodes in a cloud computing environment.

In accordance with aspects of the invention, the COS system 205 stores data using object storage technology, which uses Information Dispersal Algorithms (IDAs) to separate a data object into slices that are distributed to plural ones of the storage nodes 220. As used herein, a slice is a dispersed piece of encoded data. Slices are created from an original data object and can be used to recreate the original data object. In particular, the COS system 205 creates slices using a combination of erasure coding, encryption, and dispersal algorithms. The erasure coding generates 'extra' slices for each data object, such that the data object can be recreated from a subset (less than all of) the total number of slices that are stored for this data object. By dividing a data object into slices and storing the slices at plural different storage nodes 220, the COS system 205 ensures that no single one of the storage nodes 220 has all the slices that are necessary to recreate the data object. Moreover, by creating extra slices for each data object, the COS system 205 can tolerate multiple failures without losing the ability to recreate the original data object, e.g., from the available slices.

According to aspects of the invention, the COS manager 230 provides a management interface that is used for system administrative tasks, such as system configuration, storage provisioning, and monitoring the health and performance of the system. The COS manager 230 may comprise a physical device (e.g., an instance of computer 101 FIG. 1), a virtual machine (VM), or a container (e.g., a Docker container).

According to aspects of the invention, the processing nodes 210 are configured to encrypt and encode data during a write operation, to manage the dispersal of slices of data during a write operation, and to decode and decrypt data during a read operation. In embodiments, the processing nodes 210 are stateless components that present a storage interface to a client application and that transform data objects into slices using an IDA. Each processing node 210 may comprise a physical device (e.g., an instance of computer 101 of FIG. 1), a virtual machine (VM), or a container (e.g., a Docker container).

According to aspects of the invention, the storage nodes 220 are configured to store the data slices that are received from a processing node 210 during a write, and to return data slices to a processing node 210 during a read. Each storage node 210 comprises a physical computer storage device, such as persistent storage 113 of FIG. 1, for example.

In implementations, a client device 250 runs a client application that communicates with one of the processing nodes 210 to perform data operations in the COS system 205. In embodiments, the client application uses application programming interfaces (APIs) to perform data operations in the COS system 205. In one example, a first API call (e.g., PUT) writes a data object to the COS system 205, a second API call (e.g., GET) reads a data object from the COS system 205, a third API call (e.g., DELETE) deletes a data object from the COS system 205, and a fourth API call (e.g., LIST) lists all the data objects in a bucket in the COS system 205. In embodiments, the client device 250 comprises a computer device such as a laptop computer, desktop computer, tablet computer, etc., and may comprise an instance of the end user device 103 of FIG. 1. In embodiments, the client device 250 communicates with one of the processing nodes 210 via the network 240, which may correspond to the WAN 102 of FIG. 1.

In embodiments, a vault is a group of processing nodes 210 and storage nodes 220 in the COS system 205. A vault can be spread across plural storage nodes 220, and the COS system 205 may include plural different vaults. For example, the COS system 205 may include a first vault at a first geographic location (e.g., Texas), and a second vault at a second geographic location (e.g., Germany). In embodiments, a bucket is a logical storage unit of a vault. As used herein, a bucket is a group of objects stored in a vault that share a same namespace within the vault, where the namespace is an address structure used to identify objects in the system. A vault can have plural different buckets (and, therefore, plural different namespaces). Each bucket stores one or more objects, e.g., as plural slices in various ones of the storage nodes 220 in the vault.

In a particular example of operation, when the COS system 205 has data to store, it disperse storage error encodes the data in accordance with a dispersed storage error encoding process based on dispersed storage error encoding parameters. The data may comprise a data object that can include a file such as text, video, audio, etc. In embodiments, the dispersed storage error encoding parameters include an encoding function (e.g., an IDA), a data segmenting protocol (e.g., data segment size, fixed, variable, etc.), and per data segment encoding values. The per data segment encoding values may include: a total, or pillar width, number of encoded data slices per encoding of a data segment (i.e., in a set of encoded data slices); a decode threshold number of encoded data slices of a set of encoded data slices that are needed to recover the data segment; a read threshold number of encoded data slices to indicate a number of encoded data slices per set to be read from storage for decoding of the data segment; and/or a write threshold number to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In an example, the encoding function comprises an IDA, the data segmenting protocol is to divide the data object into fixed sized data segments, and the per data segment encoding values include: a pillar width numeric value; a decode threshold numeric value; a read threshold numeric value; and a write threshold numeric value. In accordance with the data segmenting protocol, a processing node divides the data object into a plurality of fixed sized data segments. The number of data segments created is dependent of the size of the data and the data segmenting protocol. A processing node then disperse storage error encodes each data segment using the encoding function (e.g., the information dispersal algorithm) to produce a set of encoded data slices.

In embodiments, a processing node also creates a slice name for each encoded data slice in the set of encoded data slices. A typical format for a slice name includes a pillar number of the encoded data slice, a data segment number, a vault identifier, a data object identifier, and may further include revision level information of the encoded data slices. The slice name functions as, at least part of, an address for the encoded data slice for storage and retrieval from the COS system. As a result of encoding, the processing node produces a plurality of sets of encoded data slices, which are provided with their respective slice names to the storage nodes for storage. In this manner, the COS system stores a data object as a plurality of sets of encoded data slices stored at one or more storage nodes, where the encoded data slices are generated using an encoding function, a data segmenting protocol, and per data segment encoding values.

In embodiments, to retrieve a data object that has been stored as encoded data slices as described herein, the system retrieves from the storage nodes at least the decode threshold number of encoded data slices per data segment of the data object. As a specific example, a processing node retrieves a read threshold number of encoded data slices. To recover a data segment from a decode threshold number of encoded data slices, the processing node uses a decoding function that is essentially an inverse of the encoding function. In one example, the processing node then recreates the data object from the recovered data segments and provides the data object to a client computing device that requested the data object.

Figure 3:
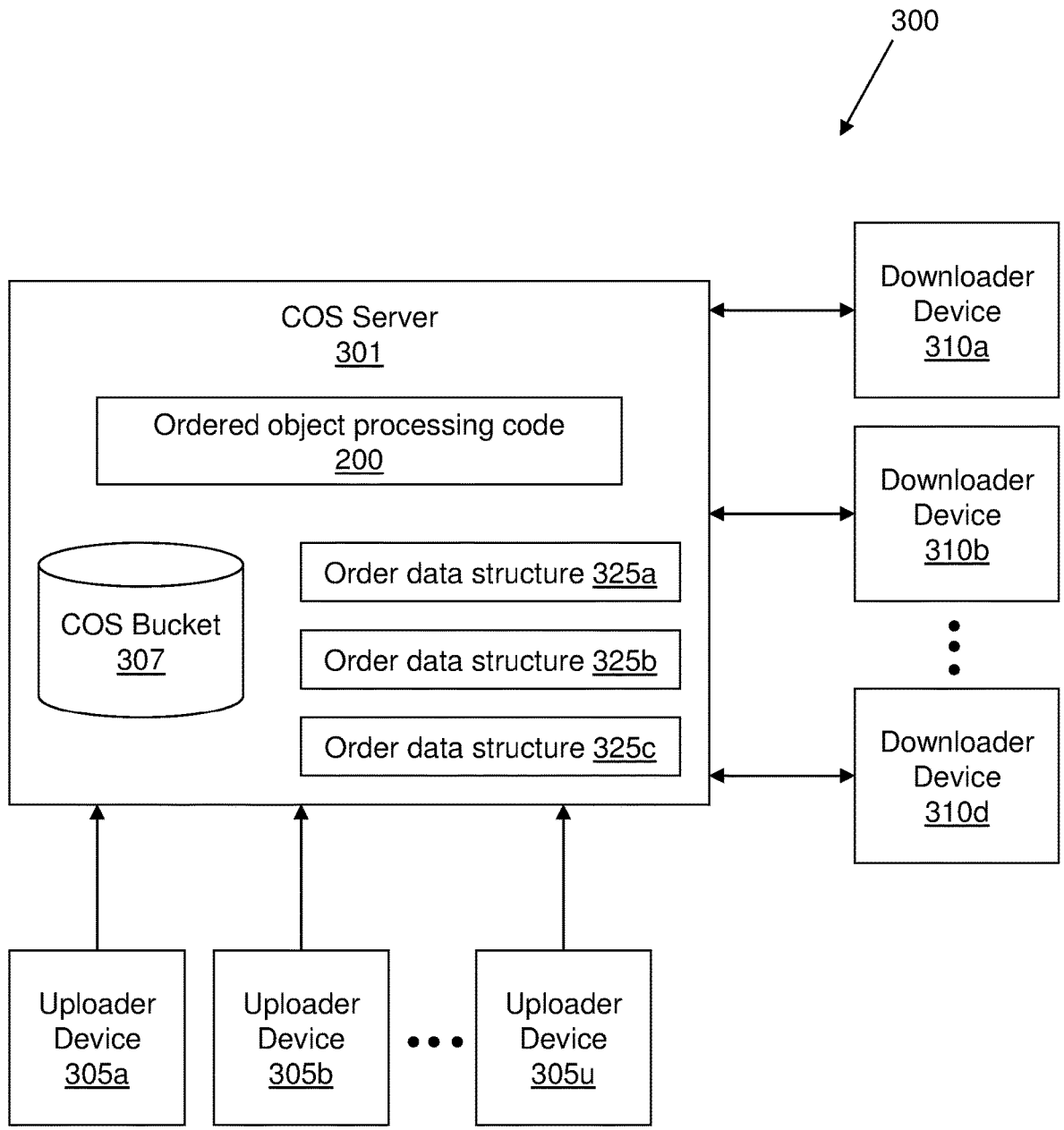
FIG. 3 shows an environment in accordance with aspects of the invention.

FIG. 3 shows an environment 300 in accordance with aspects of the invention. The environment includes a COS server 301, one or more uploader devices 305a, 305b, . . . , 305u that upload data objects to the COS server 301 for storage in a COS bucket 307, and one or more downloader devices 310a, 310b, . . . , 310d that download objects that are stored in the COS bucket 307.

In embodiments, the COS server 301 comprises the computer 101 of FIG. 1 and includes the ordered object processing code 200 that is configured to perform the inventive methods as described herein. In a particular example, the COS server 301 comprises a processing node 210 of FIG. 2 and each of the data objects stored in the COS bucket 307 is stored as a plurality of sets of encoded data slices stored at one or more storage nodes 220 as described with respect to FIG. 2.

In embodiments, each of the uploader devices 305a-u and each of the downloader devices 310a-d comprises an instance of an end user device 103 of FIG. 1. In a particular example, each of the uploader devices 305a-u and each of the downloader devices 310a-d comprises an instance of a client device 250 of FIG. 2 and uploads or downloads data objects to and from the COS bucket 307 by sending API calls to the COS server 301.

In embodiments, COS bucket 307 is a logical storage unit (e.g., of a vault) in a COS system of the environment 300. In one example, and as described with respect to FIG. 2, a bucket is a group of objects stored in a vault that share a same namespace within the vault, where the namespace is an address structure used to identify objects in the system. A vault can have plural different buckets (and, therefore, plural different namespaces). Each bucket stores one or more objects, e.g., as plural encoded data slices in various ones of the storage nodes 220 in the vault.

The environment 300 provides an inventive way of downloading objects from the COS bucket 307 according to an ordered list that is created by and maintained at the COS server 301. In embodiments, the COS bucket 307 stores objects (e.g., data objects such as files) received from the one or more uploader devices 305a-u. In accordance with aspects of the invention, the one or more downloader devices 310a-d operate asynchronously from the uploader devices 305a-u and wish to download objects from the COS bucket 307 in a predefined order. In a particular example, the downloader is a downloading application running on one of the downloader devices 310a-d, and the downloading application operates asynchronously from the uploader devices 305a-u and is configured to download objects from the COS bucket 307 in a predefined order. Examples of predefined orders include but are not limited to: first in first out; first in last out; largest object size to smallest object size; and smallest object size to largest object size. Other predefined orders may be used. According to aspects of the invention, the one or more predefined orders for downloading objects from the COS bucket 307 are defined in order data structures 325a, 325b, 325c that are created and maintained by the COS server 301.

In a system that does not operate according to aspects of the invention, a downloader (e.g., a user or software application) wishing to download objects from a COS bucket in a particular order would use the downloader device to create a list and then download the objects according to that list. For example, the downloader device would: obtain, from a COS server, object metadata for all objects in a COS bucket; create a list of the objects sorted in a particular order based on the obtained metadata; and download the objects from the COS bucket according to the list. This technique, where the ordered list is created and maintained at the downloader device, requires the COS server to transmit metadata for all the objects to the downloader device, which costs network resources for data transfer. This technique, where the ordered list is created and maintained at the downloader device, also poses a problem of the list becoming invalid if the contents of the COS bucket change in the time between when the downloader device created the list and when the downloader device has finished the download using the list. In other words, the list created by the downloader may become invalid if new objects are added to the bucket and/or if existing objects are deleted from the bucket while the downloader device is still using the list.

To address this problem, the COS server 301 in accordance with aspects of the invention creates and maintains one or more order data structures 325a, 325b, 325c for each COS bucket 307. In embodiments, the ordered object processing code 200 creates a particular order data structure, e.g., order data structure 325a, based on input from an administrator defining the order to be used in the particular order data structure. For example, an administrator may provide input to create a list for COS bucket 307 that orders the objects according to file size. In response to this input, the ordered object processing code 200 analyzes the metadata of all the objects currently in the COS bucket 307 and generates a sorted list of these objects, where the sorted list is a list of the objects sorted according to file size of each object. In this example, the ordered object processing code 200 saves the list in the order data structure 325a, which may be stored at the COS server 301. In embodiments, the ordered object processing code 200 maintains the list defined in the order data structure 325a by updating the list each time a new object is added to the COS bucket 307 and updating the list each time an existing object is deleted from the COS bucket 307. Continuing the same example, after the order data structure 325a is created, in response to an uploader device adding a new object to the COS bucket 307, the ordered object processing code 200 updates the list in the order data structure 325a to include this new object in the appropriate position in the list according to its file size, i.e., relative to the file sizes of the other objects already in the list. In this same example, after the order data structure 325a is created, in response to the COS server 301 deleting an object from the COS bucket 307, the ordered object processing code 200 updates the list in the order data structure 325a by deleting this deleted object from the list. In this manner, the ordered object processing code 200 maintains an up-to-date list in the order data structure 325a even as objects are added to and deleted from the COS bucket 307, such that the list never becomes invalid, which is a great advantage over the aforementioned technique where a list is created and maintained at the downloader device.

In embodiments, the ordered object processing code 200 maintains plural different order data structures 325a-c for the COS bucket 307, with each of the different order data structures 325a-c defining a different type of ordering of the objects in the COS bucket 307. For example, a first order data structure 325a may contain of list of the objects in the COS bucket 307 sorted according to FIFO, a second order data structure 325b may contain of list of the objects in the COS bucket 307 sorted according to FILO, and a third order data structure 325c may contain of list of the objects in the COS bucket 307 sorted according to file size largest to smallest. In embodiments, the ordered object processing code 200 dynamically updates each order data structure 325a-c as a new object is added to the COS bucket 307 or an existing object is removed from the COS bucket 307.

In accordance with aspects of the invention, when a downloader wishes to download objects from the COS bucket 307 in a specific order, the downloader device (e.g., 310a in this example) sends a first API call to the COS server 301 where the first API call specifies the COS bucket 307 and the desired order. In response to this first API call, the ordered object processing code 200 allocates a server-side iterator for this download and sends (e.g., returns) an identifier of the iterator (iterator ID) to the requesting downloader device 310a. In embodiments, the iterator comprises a code object that points to an object in a list defined by a particular one of the order data structures 325a-c that corresponds to the order indicated in the first API call. In response to receiving the iterator ID, the downloader device 310a sends a second API call to the COS server 301 where the second API call includes the iterator ID and a local filename or path on the downloader device 310a. In response to receiving the second API call with the iterator ID, the ordered object processing code 200 uses the iterator and the corresponding order data structure to transfer the objects from the COS bucket 307 to the requesting downloader device 310a in the order defined by the order data structure.

As is understood in the art, an iterator is an object that, pointing to some element in a range of elements, has the ability to iterate through the elements of that range using a set of operators, such as increment (e.g., "++"). Iterators are capable of iterating through the ordered data structure and maintaining validity even when a new node is added to the ordered data structures. Within the context of the present disclosure, this means that adding objects to (or removing objects from) the COS bucket 307 during a download by a downloader device 310a does not invalidate the order that the objects are downloaded to the downloader device 310a. Instead, when an object is added to (or removed from) the COS bucket 307, the ordered object processing code 200 updates the list in the order data structure (e.g., 325a), and the iterator maintains a valid pointer to a location of the order data structure after updating the order data structure.

Figures 4, 5:
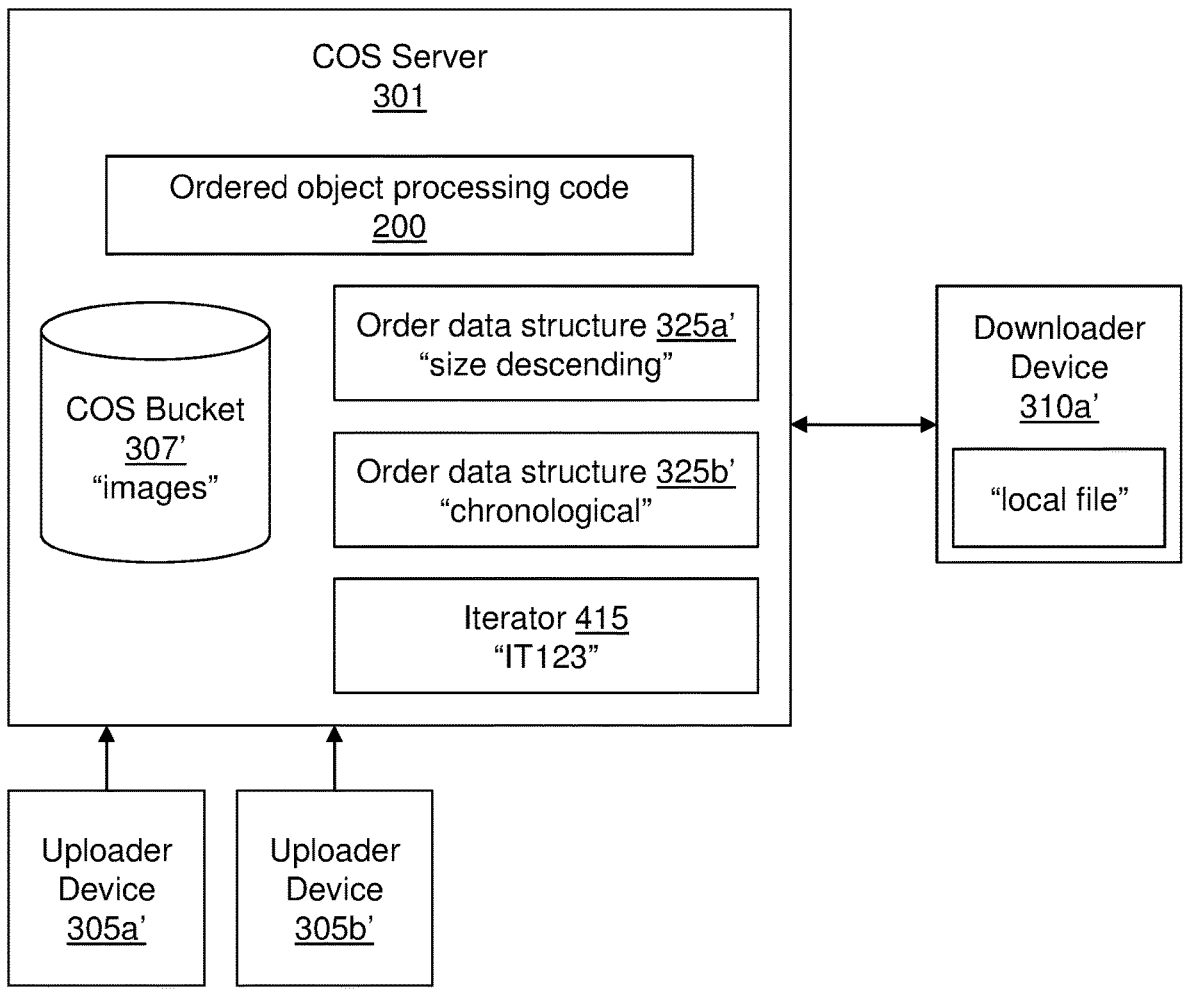
FIG. 4 illustrates an exemplary use case in accordance with aspects of the invention.
FIG. 5 shows example syntax of application programming interface (API) calls used in embodiments of the invention.

FIG. 4 illustrates an exemplary use case in accordance with aspects of the invention. In this use case, uploader device 305a' is a first Internet of Things (IoT) camera that uploads its images to the COS bucket 307 according to a first schedule (e.g., once a minute), and uploader device 305b' is a second IoT camera that uploads its images to the COS bucket 307' according to a second schedule (e.g., once an hour). In this example, the COS bucket 307' has the name "images" assigned by the COS server 301. In this example, an administrator provides an ordering API call that creates a first order data structure 325a' that includes a list of the objects in the COS bucket 307' sorted according to a first ordering type of "size descending". In this example, the administrator provides another ordering API call that creates a second order data structure 325b' that includes a list of the objects in the COS bucket 307' sorted according to second ordering type of "chronological". As described herein, the ordered object processing code 200 creates the respective lists in the respective order data structures 325a', 325b' using the metadata of the objects in the COS bucket 307'. As described herein, the ordered object processing code 200 continually updates the respective lists in the respective order data structures 325a', 325b' when new objects are added to the COS bucket 307', when existing objects are deleted from the COS bucket 307', and when existing objects are updated (e.g., changed) in the COS bucket 307'.

With continued reference to FIG. 4, in this exemplary use case the downloader device 310a' sends a request for iterator API call to the COS server 301. In this example, the request for iterator API call includes the bucket name (e.g., "images") and the ordering type (e.g., "chronological"). In this example, in response to receiving the request for iterator API call, the ordered object processing code 200 creates an iterator 415 having an iterator ID "IT123". In this example, the iterator 415 is associated with the order data structure 325b' based on the request for iterator API call specifying the ordering type (e.g., "chronological") of this particular order data structure. In this example, the ordered object processing code 200 returns the iterator ID "IT123" to the downloader device 310a' that sent the request for iterator API call.

Still referring to the exemplary use case of FIG. 4, in response to receiving the iterator ID from the COS server 301, the downloader device 310a' sends a download API call to the COS server 301 where the download API call includes the iterator ID (e.g., "IT123") and a local filename or path on the downloader device 310a' (e.g., "local file"). In this example, in response to receiving the download API call, the ordered object processing code 200 uses the iterator specified in the download API call (e.g., "IT123") to iterate through the list in the associated order data structure 325b' and returns objects in the COS bucket 307 to the downloader device 310a' in the order specified in the list in the order data structure 325b'. The objects are saved on the downloader device 310a' at the file location or path specified in the download API call (e.g., "local file" in this example).

FIG. 4 is described with respect to the exemplary use case of images from two IoT cameras being uploaded to the COS bucket 307' and the downloader requesting the objects in chronological order. Implementations of the invention are not limited to this example. In another non-limiting example, five cameras upload objects to the COS bucket and the downloader wants to download the objects from camera number two first. In this example, the order can be defined based on the identity of the source that uploaded the object to the bucket. Another non-limiting example includes downloading objects in chronological order from an archive-restored bucket. Another non-limiting example includes medical edge devices uploading images to the COS bucket, and the downloader wishes to download the images in order of metadata that defines different levels of emergency.

FIG. 5 shows example syntax of novel API calls used in embodiments of the invention. Specifically, FIG. 5 shows syntax for an ordering API call 511 that includes the bucket name and ordering type, a request for iterator API call 512 that includes a bucket name and ordering type, and a download API call 513 that includes an iterator ID and a local filename. These novel API calls 511, 512, 513 may be used in the manner described with respect to FIG. 4 to create ordered data structures, request an iterator for a bucket, and request a download of objects using an iterator, respectively.

Figure 6:
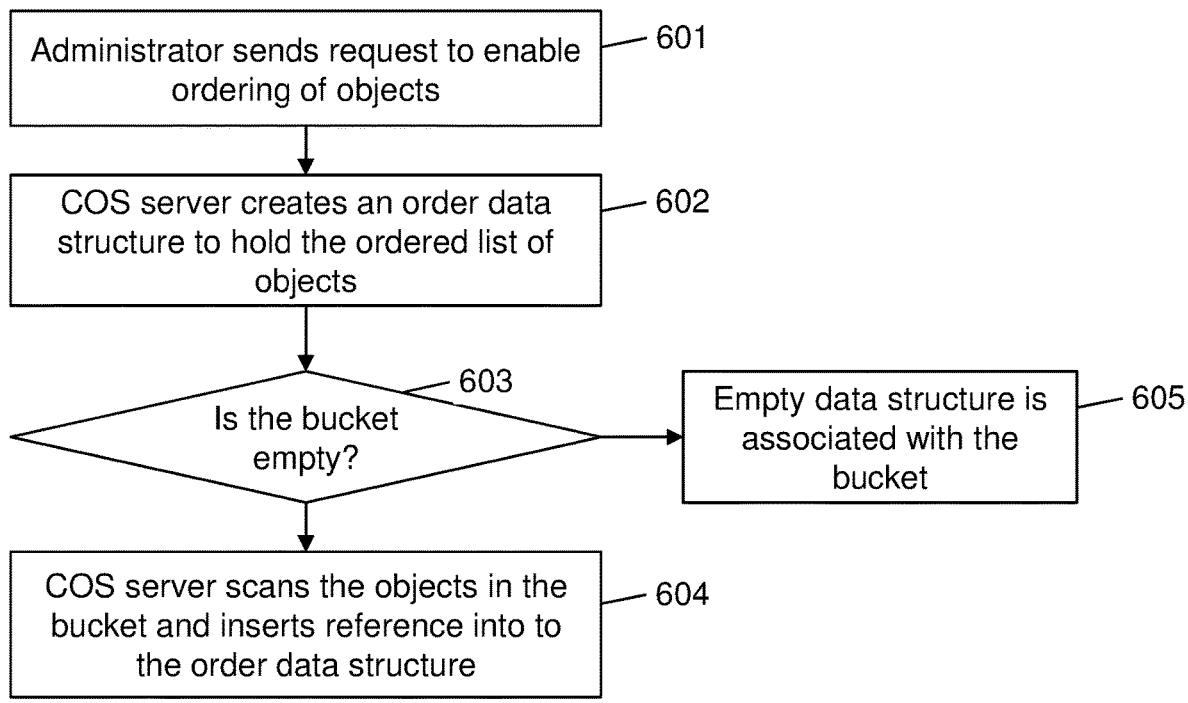
FIGS. 6-9 show flowcharts of exemplary methods in accordance with aspects of the invention.

FIG. 6 shows a flowchart of an exemplary method in accordance with aspects of the present invention. Steps of the method may be carried out in the environment of FIG. 3 and are described with reference to elements depicted in FIG. 3.

At step 601, an administrator sends a request to enable ordering of objects in a bucket. This may be performed using the ordering API call 511 shown in FIG. 5 and described in FIG. 4. At step 602, in response to the request of step 601, the COS server creates an order data structure to hold an ordered list that includes references (e.g., pointers) to the objects stored in the COS bucket. In embodiments, step 602 involves creating the order data structure (e.g., 325a, etc.). At step 603, the COS server determines whether the bucket is empty, e.g., by analyzing COS system data associated with the bucket. If the bucket is not empty, then at step 604, the COS server scans the objects in the bucket and inserts a reference for each object in the order data structure. As described herein, the result of step 604 is a list defined in the order data structure, where the list includes the objects in the COS bucket sorted according to the criteria specified in the request of step 601. If the bucket is empty, then at step 605 the order data structure created as step 602 remains empty.

Figure 7:
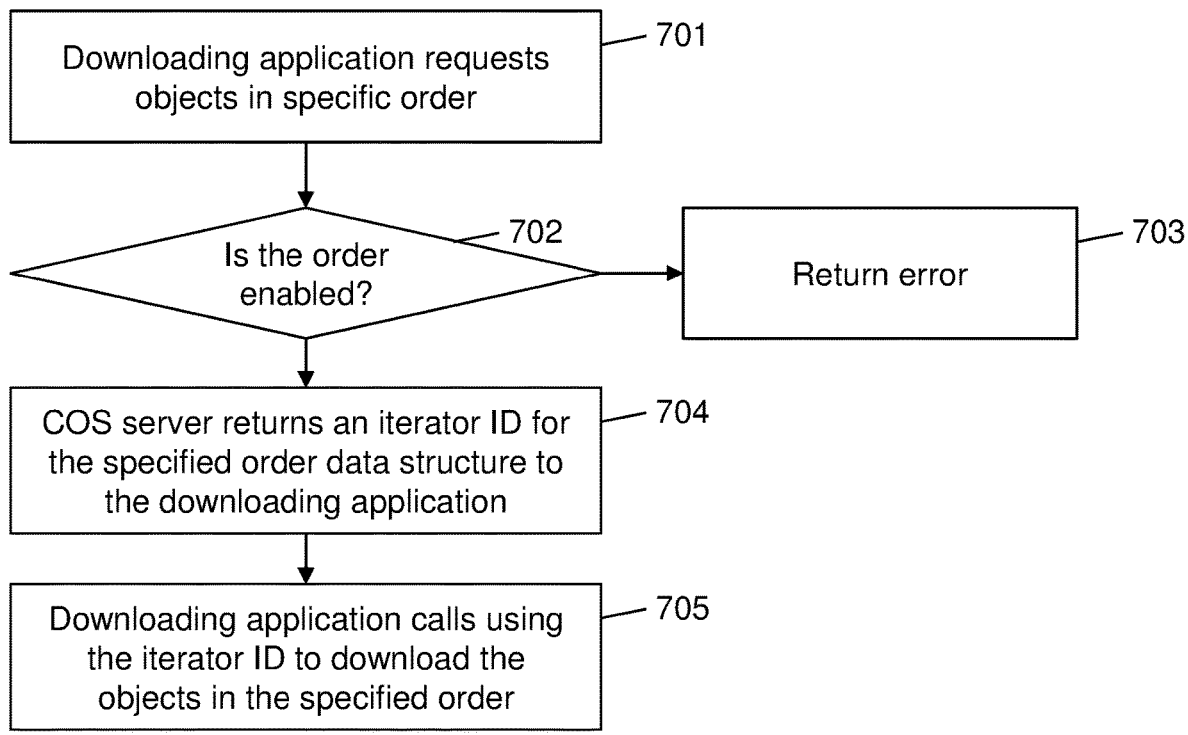

FIG. 7 shows a flowchart of an exemplary method in accordance with aspects of the present invention. Steps of the method may be carried out in the environment of FIG. 3 and are described with reference to elements depicted in FIG. 3.

At step 701, a downloading application requests objects from a bucket in a specific order. This may be performed by the downloading device (i.e., the device running the downloading application) using the request for iterator API call 512 shown in FIG. 5 and described in FIG. 4. At step 702, the COS server determines whether the order type requested at step 701 is enabled for the bucket indicated in the request at step 701. In embodiments, the ordered object processing code 200 determines whether an order data structure exists for the bucket and the order type indicated in the request at step 701. If the order data structure does not exist, then at step 703 the COS server returns an error to the downloading application that sent the request for iterator API call. If the order data structure does exist, then at step 704 the COS server creates an iterator having an iterator ID and returns the iterator ID to the downloading application that sent the request for iterator API call. At step 705, the downloading application calls the COS server using the iterator ID to download the objects from the bucket in the specified order. This may be performed by the downloading application using the download API call 513 shown in FIG. 5 and described in FIG. 4.

Figure 8:
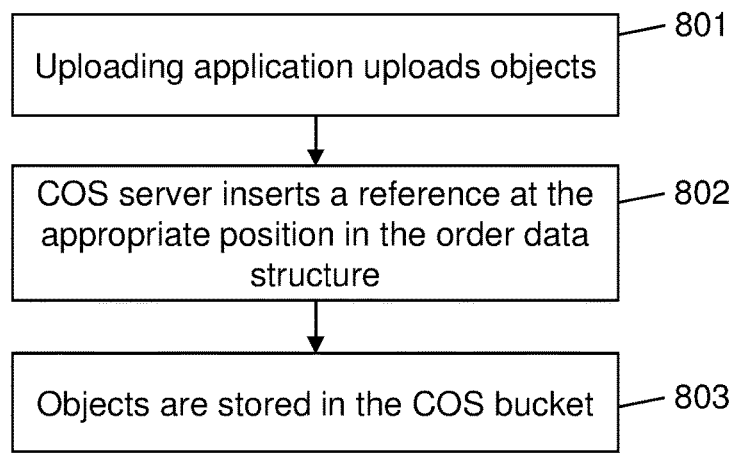

FIG. 8 shows a flowchart of an exemplary method in accordance with aspects of the present invention. Steps of the method may be carried out in the environment of FIG. 3 and are described with reference to elements depicted in FIG. 3.

At step 801, an uploading application uploads an object to the bucket. At step 802, the COS server inserts a reference, for the object that was uploaded step 801, at an appropriate position in the order data structure. The appropriate position may be determined by comparing metadata of the uploaded object to metadata of other objects in the bucket. At step 803, the COS server stores the object in the bucket.

Figure 9:
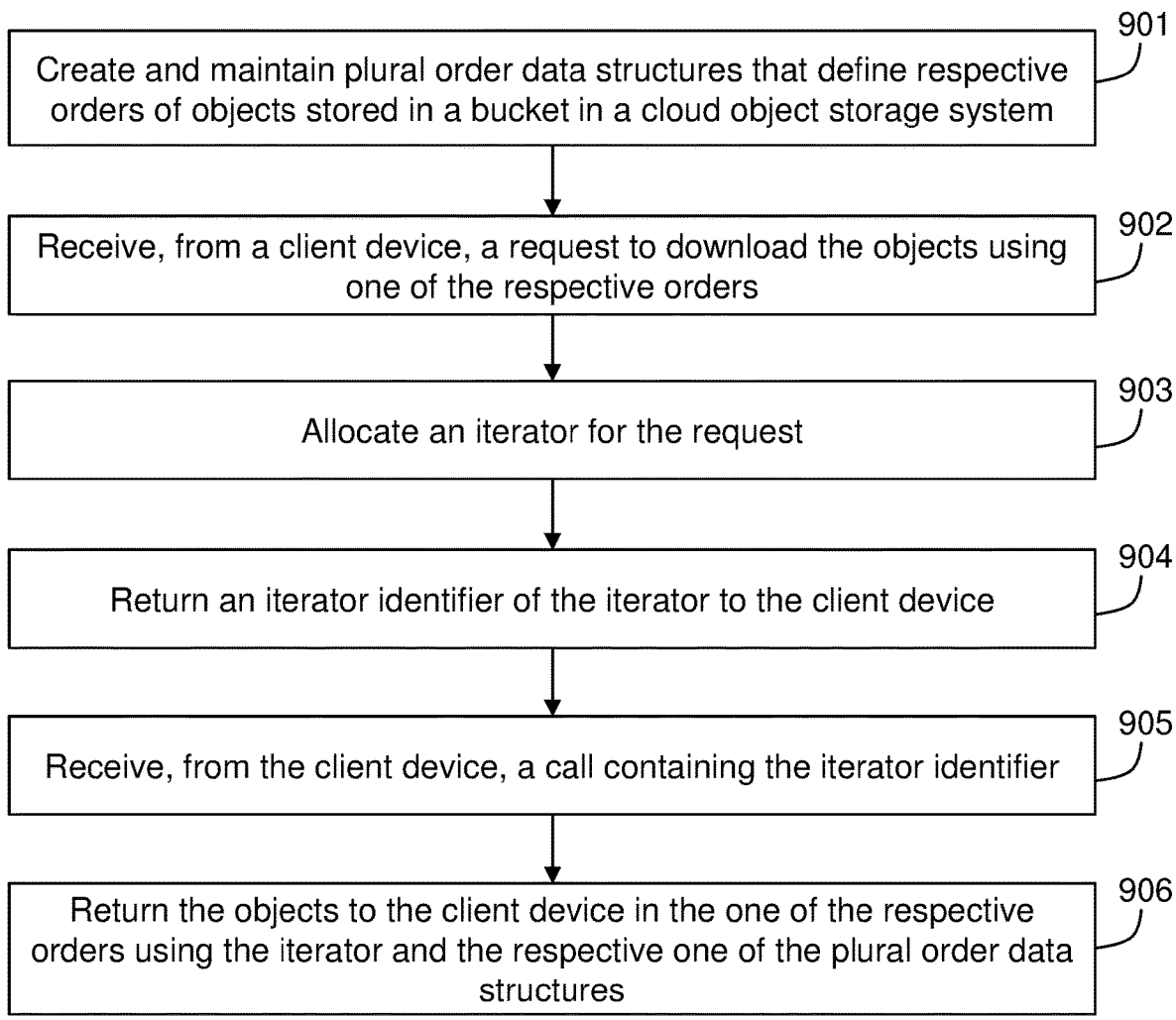

FIG. 9 shows a flowchart of an exemplary method in accordance with aspects of the present invention. Steps of the method may be carried out in the environment of FIG. 3 and are described with reference to elements depicted in FIG. 3.

Step 901 comprises creating and maintaining, by a cloud object storage server, plural order data structures that define respective orders of objects stored in a bucket in a cloud object storage system. In embodiments and as described at FIGS. 3 and 4, the ordered object processing code 200 of the COS server 301 creates and maintains order data structures 325a-c, each of which defines a different order of the objects in the COS bucket 307.

Step 902 comprises receiving, by the cloud object storage server and from a client device, a request to download the objects using one of the respective orders. In embodiments and as described at FIGS. 3 and 4, the ordered object processing code 200 of the COS server 301 receives a request from a downloader device to download objects in the COS bucket 307 in a particular order. In one example, the request is in the form of API call 512.

Step 903 comprises allocating, by the cloud object storage server, an iterator for the request, wherein the iterator is associated with a respective one of the plural order data structures that defines the one of the respective orders. In embodiments and as described at FIGS. 3 and 4, the ordered object processing code 200 of the COS server 301 creates an iterator (e.g., iterator 415) to handle this request.

Step 904 comprises returning, by the cloud object storage server, an iterator identifier of the iterator to the client device. In embodiments and as described at FIGS. 3 and 4, the ordered object processing code 200 of the COS server 301 returns an iterator ID (e.g., "IT123" of iterator 415) to the downloader device that made the request at step 903.

Step 905 comprises receiving, by the cloud object storage server and from the client device, a call containing the iterator identifier. In embodiments and as described at FIGS. 3 and 4, the ordered object processing code 200 of the COS server 301 receives a request from the same downloader device that submitted the request at step 903. The request at step 905 includes the iterator identifier that was returned at step 904. The request at step 905 may be in the form of API call 513.

Step 906 comprises returning, by the cloud object storage server, the objects to the client device in the one of the respective orders using the iterator and the respective one of the plural order data structures. In embodiments and as described at FIGS. 3 and 4, the ordered object processing code 200 of the COS server 301 uses the iterator 415 to iterate through the one of the order data structures associated with the iterator and to return (e.g., transmit copies of) the objects to the client device in the order defined in this particular one of the one of the order data structures.

In embodiments, the maintaining the plural order data structures comprises updating the plural order data structures in response to a new object being added to the bucket or one of the objects being deleted from the bucket. In embodiments and as described at FIGS. 3 and 4, the ordered object processing code 200 of the COS server 301 updates the order data structures 325a-c when a new object is uploaded to the COS bucket 307 or when an existing object is deleted from the COS bucket 307 or when one of the objects in the COS bucket 307 is updated.

In embodiments, the iterator comprises a server-side iterator. In embodiments and as described at FIGS. 3 and 4, the iterator 415 resides on the COS server 301 and not on the client device (e.g., not on the downloader device).

In embodiments, the iterator is dedicated to the client device, or an application running on the client device, for the request. In embodiments and as described at FIGS. 3 and 4, the ordered object processing code 200 of the COS server 301 allocates a different iterator for each request from each client. In this manner, different downloader devices (e.g., client devices) have different iterators for the same order data structure. Similarly, a single downloader device (e.g., client device) can have plural different iterators for plural different requests.

In embodiments, the respective orders are based on metadata of the objects stored in the bucket. In embodiments and as described at FIGS. 3 and 4, the orders defined in the order data structures 325a-c are determined based on metadata of the objects in the COS bucket 307. This metadata may include, but is not limited to, file size, date and time of upload, date and time of file creation, source of file upload (e.g., identifier of the uploader device), etc.

In embodiments, the client device operates asynchronously from devices that upload the objects to the bucket. In embodiments and as described at FIGS. 3 and 4, the downloader devices 310a-d operate asynchronously from the uploader devices 305a-u. In one example, the downloader devices 310a-d do not communicate or otherwise interact with the uploader devices 305a-u.

In embodiments, the request to download the objects comprises an application program interface call that specifies a name of the bucket and the one of the respective orders. In embodiments and as described at FIGS. 4 and 5, the request to download the objects may comprise API 512.

In embodiments, the creating the order data structure is performed in response to receiving an application program interface call that specifies a name of the bucket and the one of the respective orders. In embodiments and as described at FIGS. 4 and 5, the order data structure may be created in response to API 511.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
creating and maintaining, by a cloud object storage server, plural order data structures that define respective orders of objects stored in a bucket in a cloud object storage system;
receiving, by the cloud object storage server and from a client device, a request to download the objects using one of the respective orders;
allocating, by the cloud object storage server, an iterator for the request, wherein the iterator is associated with a respective one of the plural order data structures that defines the one of the respective orders;
returning, by the cloud object storage server, an iterator identifier of the iterator to the client device;
receiving, by the cloud object storage server and from the client device, a call containing the iterator identifier; and
returning, by the cloud object storage server, the objects to the client device in the one of the respective orders using the iterator and the respective one of the plural order data structures.

2. The method of claim 1, wherein the maintaining the plural order data structures comprises updating the plural order data structures in response to a new object being added to the bucket, one of the objects being deleted from the bucket, or one of the objects being updated.

3. The method of claim 1, wherein the iterator comprises a server-side iterator.

4. The method of claim 1, wherein the iterator is dedicated to the client device, or an application running on the client device, for the request.

5. The method of claim 1, wherein the respective orders are based on metadata and attributes of the objects stored in the bucket.

6. The method of claim 1, wherein the client device, or an application running on the client device, operates asynchronously from devices that upload the objects to the bucket.

7. The method of claim 1, wherein the request to download the objects comprises an application program interface call that specifies a name of the bucket and the one of the respective orders.

8. The method of claim 1, wherein the creating and maintaining the plural order data structures comprises creating a respective one of the plural order data structures in response to receiving an application program interface call that specifies a name of the bucket and the one of the respective orders.

9. A computer program product comprising one or more computer readable storage media having program instructions collectively stored on the one or more computer readable storage media, the program instructions executable to:
maintain plural order data structures that define respective orders of objects stored in a bucket in a cloud object storage system;
receive, from a client device, a request to download the objects using one of the respective orders;
allocate an iterator for the request, wherein the iterator is associated with a respective one of the plural order data structures that defines the one of the respective orders;
return an iterator identifier of the iterator to the client device;
receive, from the client device, a call containing the iterator identifier; and
return the objects to the client device in the one of the respective orders using the iterator and the respective one of the plural order data structures.

10. The computer program product of claim 9, wherein the maintaining the plural order data structures comprises updating the plural order data structures in response to a new object being added to the bucket or an existing object being deleted from the bucket.

11. The computer program product of claim 9, wherein the iterator comprises a server-side iterator.

12. The computer program product of claim 9, wherein the iterator is dedicated to the client device for the request.

13. The computer program product of claim 9, wherein the respective orders are based on metadata of the objects stored in the bucket.

14. The computer program product of claim 9, wherein the client device operates asynchronously from devices that upload the objects to the bucket.

15. A system comprising:
a processor set, one or more computer readable storage media, and program instructions collectively stored on the one or more computer readable storage media, the program instructions executable to:
create plural order data structures that define respective orders of objects stored in a bucket in a cloud object storage system;
receive, from a client device, a request to download the objects using one of the respective orders;
allocate an iterator for the request, wherein the iterator is associated with a respective one of the plural order data structures that defines the one of the respective orders;
return an iterator identifier of the iterator to the client device;
receive, from the client device, a call containing the iterator identifier; and
return the objects to the client device in the one of the respective orders using the iterator and the respective one of the plural order data structures.

16. The system of claim 15, wherein the program instructions are executable to maintain the plural order data structures by updating the plural order data structures in response to a new object being added to the bucket or an existing object being deleted from the bucket.

17. The system of claim 15, wherein the iterator comprises a server-side iterator.

18. The system of claim 15, wherein:
the iterator is dedicated to the client device for the request; and
a different iterator is allocated for each subsequent request.

19. The system of claim 15, wherein the respective orders are based on metadata of the objects stored in the bucket.

20. The system of claim 15, wherein the client device operates asynchronously from devices that upload the objects to the bucket.

* * * * *